(12) United States Patent
Wilson et al.

(10) Patent No.: US 11,263,845 B2
(45) Date of Patent: Mar. 1, 2022

(54) INTELLIGENT STORAGE DEVICE

(71) Applicant: Loop Laboratories, LLC, Chicago, IL (US)

(72) Inventors: Scott H. Wilson, Chicago, IL (US); Greg Ettenson, Austin, TX (US); Matteo Iavicoli, Chicago, IL (US); Charlie Prescott, Chicago, IL (US)

(73) Assignee: Loop Laboratories, LLC, Chicago, IL (US)

( * ) Notice: Subject to any disclaimer, the term of this patent is extended or adjusted under 35 U.S.C. 154(b) by 4 days.

(21) Appl. No.: 16/813,040

(22) Filed: Mar. 9, 2020

(65) Prior Publication Data

US 2020/0286312 A1 Sep. 10, 2020

Related U.S. Application Data

(60) Provisional application No. 62/815,977, filed on Mar. 8, 2019.

(51) Int. Cl.
| | |
|---|---|
| *G07C 9/00* | (2020.01) |
| *G07C 9/29* | (2020.01) |
| *G06F 1/26* | (2006.01) |
| *G06K 9/00* | (2022.01) |

(52) U.S. Cl.
CPC ........... *G07C 9/00563* (2013.01); *G06F 1/26* (2013.01); *G07C 9/29* (2020.01); *G06K 9/00013* (2013.01)

(58) Field of Classification Search
CPC ........ G07C 9/00912; G07C 9/37; G07C 9/33; G07C 9/29; G07C 9/00563; A61J 1/00; A61J 1/16; G06K 9/00013; G06F 1/26
See application file for complete search history.

(56) References Cited

U.S. PATENT DOCUMENTS

| | | | |
|---|---|---|---|
| 2017/0109875 A1* | 4/2017 | Shevchenko | ............. G06T 7/70 |
| 2018/0127180 A1* | 5/2018 | Gordon | .................... G07C 9/33 |

OTHER PUBLICATIONS

Trova, Facebook page obtained from https://www.facebook.com/pg/TROVA-1053389224819570/posts/?ref=page_internal on Feb. 26, 2020, 5 pp.

* cited by examiner

*Primary Examiner* — Vernal U Brown
(74) *Attorney, Agent, or Firm* — Neal, Gerber & Eisenberg LLP

(57) ABSTRACT

An intelligent storage device is provided that enables a user to securely store odorous materials, lock and unlock the storage device via a mobile device or other remote computing device, and receive alerts when the storage device is moved or tampered with. Embodiments include an intelligent storage device comprising a lid with a locking mechanism and a user-controllable device configured to activate the locking mechanism upon receiving a first user input; a container with an opening sized and shaped to receive the lid, wherein the locking mechanism is configured to securely seal the lid to the container when activated; and an electronics module configured to cause deactivation of the locking mechanism in response to receiving a second user input via the user-controllable device and upon confirming authorization of the user to access the storage device.

20 Claims, 12 Drawing Sheets

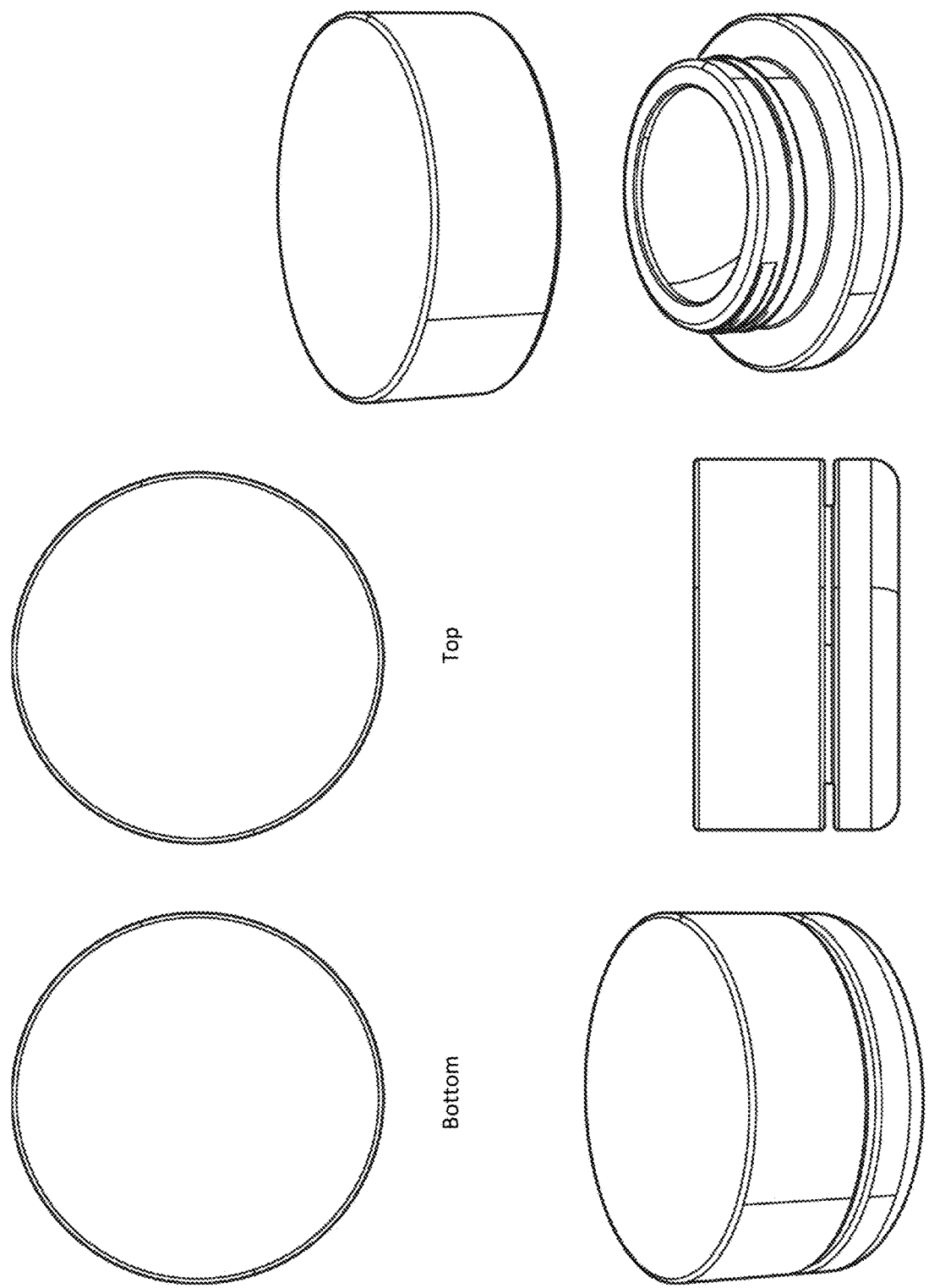

INTELLIGENT STORAGE DEVICE

CROSS-REFERENCE

This application claims the benefit of U.S. Provisional Patent Application No. 62/815,977, filed on Mar. 8, 2019, the contents of which are incorporated herein in their entirety.

TECHNICAL FIELD

The present invention relates to storage devices and methods of accessing the storage devices, particularly for the storage of medicine, herbs or other potentially harmful or odorous substances a user wishes to keep sealed and secure.

BACKGROUND

There are various devices used to administer medicine or other substances to the lungs, such as vaporizers or inhalers. With the recent growth in vaping and legalization of certain cannabis-based products, inhalers and vaporizers are becoming commonplace, and are not necessarily used for medicinal purposes. Common devices can be loaded with a cartridge containing an aerosol solution, which is then inhaled over time and the user disposes the empty cartridge when done. Other devices make use of a concentrated substance, often stored in a jar or other container.

In some cases the medicine or other inhalable materials have a strong odor. It may be desirable to store these materials in a way that minimizes or reduces odors. Further, some materials are suitable only for certain users (e.g., the prescription holder and/or only persons over a certain age), and it may be desirable to store these materials in a secure manner so that only authorized persons are able to access the materials.

Known storage solutions do not provide sufficient security and odor leak prevention and/or are not suited well for storing medicines, herbs, cannabis and the like. Existing solutions also are not suitable for travel, and do not provide various benefits and functions that are desirable to a user. Thus, there is a need for a storage solution that provides security for authorized users, odor leak prevention, and relative ease of movement.

SUMMARY OF THE INVENTION

Embodiments include an intelligent storage device that provides various benefits and solutions to the issues noted above. The storage device described and illustrated enables a user to securely store odorous materials, lock and unlock the storage device via a mobile device or other remote computing device, and receive alerts when the storage device is moved or tampered with. Embodiments of the intelligent storage device can include various features making use of remote wireless communication with a personal electronic device, such as a smartphone or computer.

One exemplary embodiment provides a portable intelligent storage device comprising a lid, a container configured to store one or more contents and having an opening that is sized and shaped to receive the lid, and a locking mechanism configured to securely seal the lid to the container when activated. The storage device further comprises a user-controllable device configured to control activation of said locking mechanism by causing the locking mechanism to form a seal between the lid and the container in response to a first user input received via the user-controllable device, and causing the locking mechanism to enter a locked position in response to a second user input received via the user-controllable device. The storage device also comprises an electronics module configured to enable deactivation of the locking mechanism upon confirming an authorization of a user to access the contents of the container.

According to some aspects, the deactivation of the locking mechanism includes causing the locking mechanism to disengage the seal in response to a third user input received via the user-controllable device. According to one aspect, the electronics module enables the deactivation of the locking mechanism by rendering access to the user-controllable button.

In some aspects, the electronics module comprises a processor and a user-authentication device configured to confirm that the user is authorized, the processor enabling deactivation of the locking mechanism upon receiving a signal from the user-authentication device confirming the authorization of the user. According to one aspect, the user-authentication device is a fingerprint sensor.

In some aspects, the electronics module comprises a processor and a wireless transceiver for communicating with a remote computing device to determine whether the user has the authorization to access the contents of the container, the processor enabling deactivation of the locking mechanism upon receiving a signal from the wireless transceiver confirming the authorization of the user. According to one aspect, the electronics module further comprises a user-authentication device configured to obtain identification information from the user, the wireless transceiver transmitting the identification information to the remote computing device for comparison to previously-stored identification information.

According to some aspects, the storage device further comprises a base configured to determine whether the container is adjacent to the base and generate an alert if the container is moved away from the base. In one aspect, the base is further configured to provide power to the storage device.

In some aspects, the user-controllable device is a rotatable, depressible button, the first user input being a rotation of the button to form the seal, and the second user input being a downward press on the button to enter the locked position. According to one aspect, the button is configured to be rotated in a first direction to engage the seal during activation of the locking mechanism, and rotated in a second, opposite direction to disengage the seal during deactivation of the locking mechanism.

Another example embodiment provides an intelligent storage device comprising a lid with a locking mechanism and a user-controllable device configured to activate the locking mechanism upon receiving a first user input; a container with an opening sized and shaped to receive the lid, wherein the locking mechanism is configured to securely seal the lid to the container when activated; and an electronics module configured to cause deactivation of the locking mechanism in response to receiving a second user input via the user-controllable device and a wireless signal from a remote computing device confirming authorization of the user to access the storage device.

In some aspects, the user-controllable device includes a user-authentication device configured to capture user identification information for determining whether a user has authorization to access the storage device. According to one aspect, the electronics module sends the user identification information to the remote computing device for verification.

According to another aspect, the user-authentication device captures the user identification information during the second user input.

In some aspects, the first user input is a manual manipulation of the user-controllable device.

While certain features and embodiments are referenced above, these and other features and embodiments of the present invention will be, or will become, apparent to one having ordinary skill in the art upon examination of the following figures and detailed description. It is intended that all such additional embodiments and features included within this description, be within the scope of the present invention, and be protected by the accompanying claims.

BRIEF DESCRIPTION OF THE DRAWINGS

The present invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 11 illustrates additional views of the concentrate container of FIG. 9, namely top and bottom views, perspective and side views of a closed container, and a perspective view of an open container.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

The term "storage materials" is used herein to denote any type of material that can be stored in the intelligent storage device described herein. In particular, the storage materials may refer to medicine, and/or one or more odorous or non-odorous substances such as waxes, oils, concentrates, dry herbs, other plant-based products, wax pods, oil pods, and dry herb pods. Various storage materials may be capable of being vaporized and inhaled by a user and are not limited to a particular consistency or format. For example, the substances may include various types of cannabis, tobacco, and other plant-based products, including blends and/or strains thereof, and may come in various forms.

Figure 1:
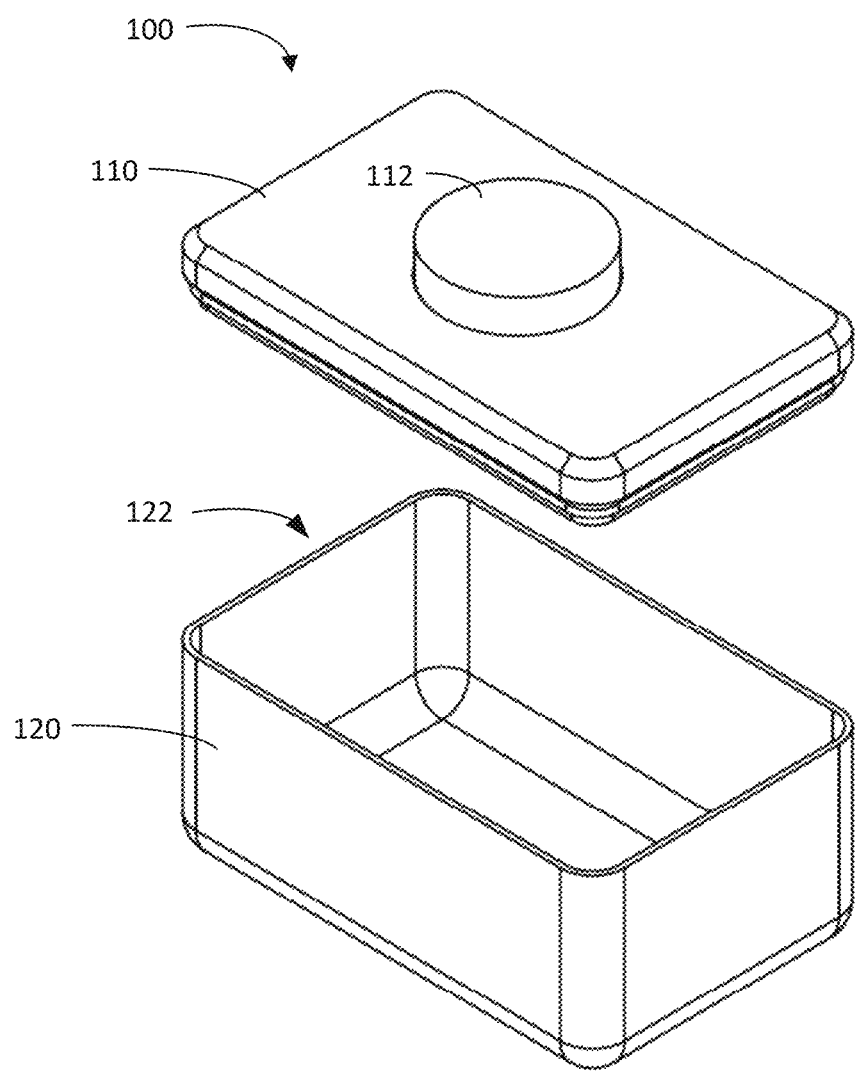
FIG. 1 is an exploded view of an exemplary intelligent storage device in accordance with certain embodiments.

FIG. 1 illustrates an exemplary intelligent storage device 100 (also referred to herein as a "smart storage device"). The term "smart storage device" is used to denote that the device includes electronics configured to perform various functions, such as transmitting and receiving data from one or more other devices (e.g., authentication data), and that the device may include a processor and/or a memory capability.

Device 100 may include a lid 110 and a box 120 (also referred to herein as a "container"). The lid 110 may be rectangular (as shown), or may be one of many other shapes, such as square, circle, oval, and more. Lid 110 may have a button 112 (also referred to herein as "user-controllable device") extending from a top side of the lid 110. Rotation of the button 112 may control one or more functions. In particular, button 112 may be configured to rotate in place within a slot formed in the lid 110, in order to control the storage device 100 to perform one or more functions. For example, upon rotating the button 112 clockwise when the lid 110 is coupled to the box 120, a sealing mechanism for creating an airtight and/or water tight seal may be engaged between the lid 110 and the box 120. This is illustrated and disclosed in more detail with respect to FIGS. 4A-4D. Similarly, rotating the button counterclockwise may cause the sealing mechanism to be disengaged. This is illustrated and disclosed in more detail with respect to FIGS. 6A-6B. Alternatively, counterclockwise rotation may engage the seal, while clockwise rotation disengages the seal.

The button 112 shown in FIGS. 1-8 is circular, but it should be appreciated that other shapes and/or configurations may be used as well. For example, rather than a circular button, a different shaped button may be used. Such button may also be configured to rotate within a slot in the lid 110 to provide control of the airtight and/or watertight seal. In one example, the slot may be circular, but the button may take a different shape (e.g., a semicircle). In such cases, the button may still be configured to rotate and provide the control described herein.

In another example, rather than using a rotating mechanism to control the storage device functions, a sliding mechanism may be used. For instance, the button may be a pin protruding from the top of the lid 110, and the pin may be configured to slide along a path that is within, or formed by, a slot in the lid 110. Sliding the pin along the path from one side to the other may cause the sealing mechanism for forming an air tight and/or water tight seal to be engaged or disengaged. The path may be a straight path, or may be curved. Various other mechanisms for control of the sealing mechanism may be used as well or instead.

As shown in FIG. 1, the button 112 protrudes from a top side of the lid 110. It should be appreciated that the button 112 may alternatively extend from a side of the lid 110, and/or from a face of the box 120.

In some examples, a spring, actuator, or other mechanism may be configured to move the button 112 upward upon actuation of a lever, pin, or other mechanism. This is illustrated and disclosed in more detail with respect to FIGS. 6A-6B. For instance, a spring may bias the button 112 outwards or upwards from the lid 110, such that the button 112 extends away from the top surface of the lid 110. The button 112 may be configured such that it is movable into and out of the lid 110, and when pushed into the lid 110, the button 112 is flush with the top surface of the lid 110.

As illustrated, the box 120 may have four walls extending up from a base to define an opening 122. The walls of the box 120 may be configured to form an air tight and/or water tight container, aside from the open top side 122, which is configured for coupling to the lid 110. The box 120 and/or lid 110 may be made from any suitable material that prevents water and/or air from passing through its surfaces.

The shape of the box 120 may be the same as, or complimentary to, that of the lid 110, or may be different (e.g., oval, square, circular, etc.). In the latter case, for example, the box 120 may have a first shape (e.g., rectangular) and the opening 122 on the top side of the box 120 may have a different shape (e.g., oval) that is similar to a shape of the lid 110 (e.g., oval), or otherwise configured to mate with, or receive, the lid 110.

The lid 110 is configured to fit onto the box 120, or be received in the top opening 112 of the box 120, and can be secured or locked thereto, so as to prevent the lid 110 from being removed from the box 120, except by an authorized person. The lid 110 is illustrated in the Figures as being completely separable from the box 120. It should be appreciated that in some examples, the lid 110 may partially attached to the box 120, for example, by coupling to the box 120 via one or more hinges or other mechanisms.

Either or both of the lid 110 and the box 120 may include a locking mechanism, or one or more parts of a locking mechanism, configured to lock or securely seal the lid 110 to the box 120 to prevent unauthorized access. The locking mechanism and/or locking mechanism parts may include one or more pins, levers, shafts, motors, actuators, etc. The locking mechanism and/or one or more parts of the locking mechanism may be electronically controlled in order to lock and/or unlock the storage device 100. In embodiments, the locking mechanism includes a sealing mechanism for creating an air tight and water tight seal between the lid 110 and box 120. The locking mechanism is illustrated and discussed in more detail below with respect to FIGS. 4A-4D and 6A-6C, particularly regarding the process of creating or forming a seal, securing the seal or otherwise locking the device 100, unsecuring/unlocking the same, and releasing the seal.

Figure 2A:
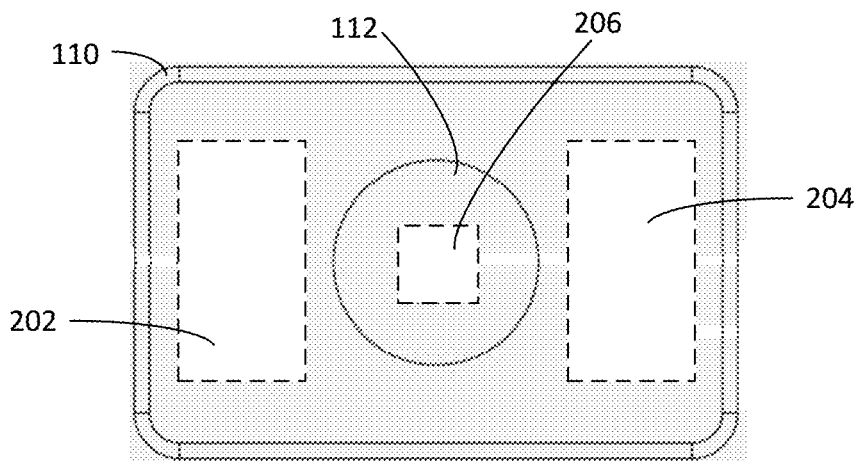
FIGS. 2A, 2B, and 2C are partially transparent top, front, and side views of the intelligent storage device of FIG. 1 in accordance with certain embodiments.
Figure 2B:
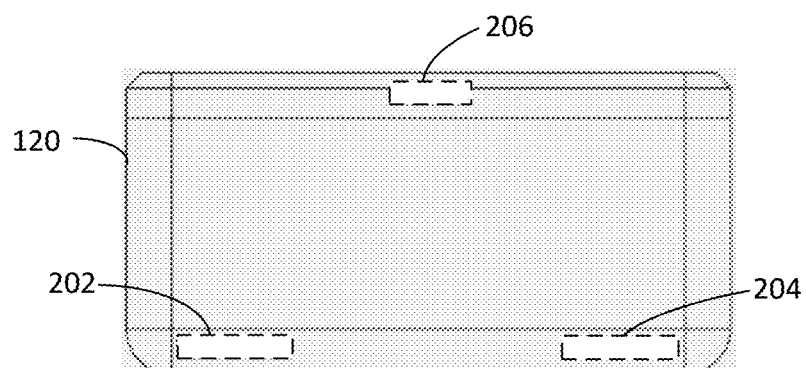
Figure 2C:
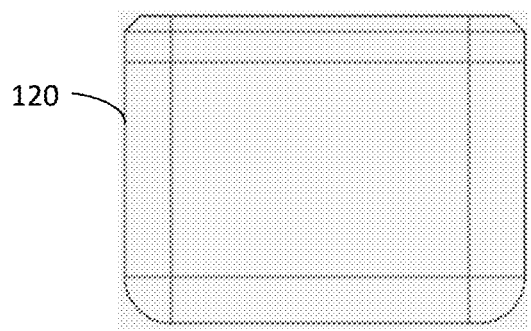

FIGS. 2A-2C are partially-transparent views of the storage device 100 showing an electronics module included in the device 100. In particular, FIG. 2A illustrates a top view of the lid 110 and box 120 coupled together, FIG. 2B illustrates a front view of the lid 110 and box 120 coupled together, and FIG. 2C illustrates a side view of the lid 110 and box 120 coupled together. The top view illustrates a battery 202, a first printed circuit board (PCB) 204, and a second PCB 206, which may collectively form the electronics module of the device 100. In some embodiments, the electronics module may include additional or different components, such as, for example, a user-authentication device for verifying an identity of the user and/or confirming that the user has authorization to access the device 100 prior to unlocking the box, as described herein. In some embodiments, such user-authentication device is included on one of the PCBs 204, 206 instead, such as, e.g., the PCB 204 positioned adjacent the button 112.

One or both of the PCBs 204 and 206 may include components configured for wireless or wired communication, such as a Bluetooth transceiver, Wi-Fi transceiver, and/or transceivers configured for communication using another protocol. Each PCB 204 and 206 may also include one or more processors and/or memory. The processor may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory includes multiple kinds of memory, particularly volatile memory and non-volatile memory. The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

One or both of the PCBs 204 and 206 may also include one or more sensors for detecting removal of the storage device 100 from a particular location. For example, the sensor(s) may include one or more accelerometers configured to detect changes in acceleration of the device 100. Other types of sensors capable of detecting movement or motion may also be used.

Storage device 100 may also include one or more wires or other electrical connection paths that may electronically couple the components (i.e., battery 202, PCB 204, and/or PCB 206) to one another, although they are not shown in the figures. In some examples, the wiring may extend through a bottom or side of the box 120 to couple the PCB 204 to the battery 202. Wiring may also extend through the box 120 into the lid 110 (e.g., via a hinge) to electronically couple the PCB 206 to the battery 202 and/or PCB 204.

The battery 202 may be any suitable size and/or shape for use with the device 100, and may be rechargeable. In some examples, one or more additional batteries may be included in the lid 110 itself, to provide power to the PCB 206. This may be beneficial where the lid 110 is completely removable from the box 120. In other examples, the PCB 206 may be electrically connected to the battery 202 and/or PCB 204 only when the lid 110 is coupled to the box 120.

It should be appreciated that the illustrated placement of battery 202, PCB 204, and PCB 206 is only one possible arrangement. Alternative arrangements may be used as well, such as putting one or more of the battery 202, PCB 204, and/or PCB 206 in the walls of the box 120, in the lid 110, and/or by changing the placement of these components within the bottom of the box 120.

Figure 3A:
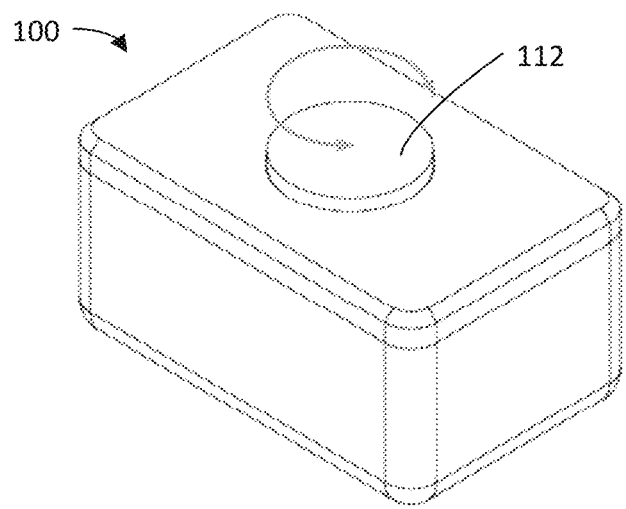
FIGS. 3A and 3B illustrate an exemplary locking process for the intelligent storage device of FIG. 1 in accordance with certain embodiments.
Figure 3B:
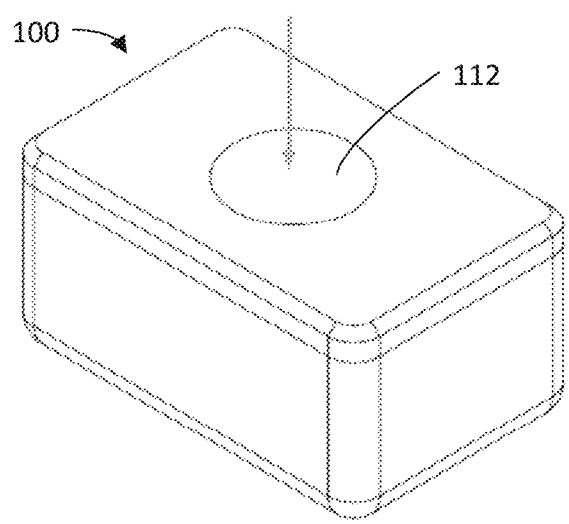

FIGS. 3A and 3B illustrate a sealing and locking procedure of the device 100 according to a particular embodiment in which the button 112 (or knob) is circular and the locking mechanism is controlled, at least partially, by rotation of the button 112. In FIG. 3A, rotation of the button 112 causes engagement of a sealing mechanism for forming an air tight and/or water tight seal between lid 110 and the box 120. This rotation can be clockwise or counterclockwise, but for the purpose of illustration in this example, the rotation to engage the seal is clockwise. As noted above, alternative mechanisms instead of, or in addition to, rotation may be used to control the sealing of the device 100.

In the example shown in FIG. 3A, rotation of the button 112 causes the sealing mechanism to expand until flush with a perimeter of the box 120 and/or lid 110 on all sides, thus forming a seal. When engaged, the seal may cause the storage device 100 to be airtight and/or water tight, such that odors or smells are reduced, or prevented from escaping. As shown in FIG. 3B, pressing the button 112 down into the lid 112 locks the sealing mechanism in this expanded or locked position, thus preventing disengagement of the seal between the lid 110 and the box 120, and renders the button 112 inaccessible, thus completing the locking procedure, as explained in more detail below.

Figure 4A:
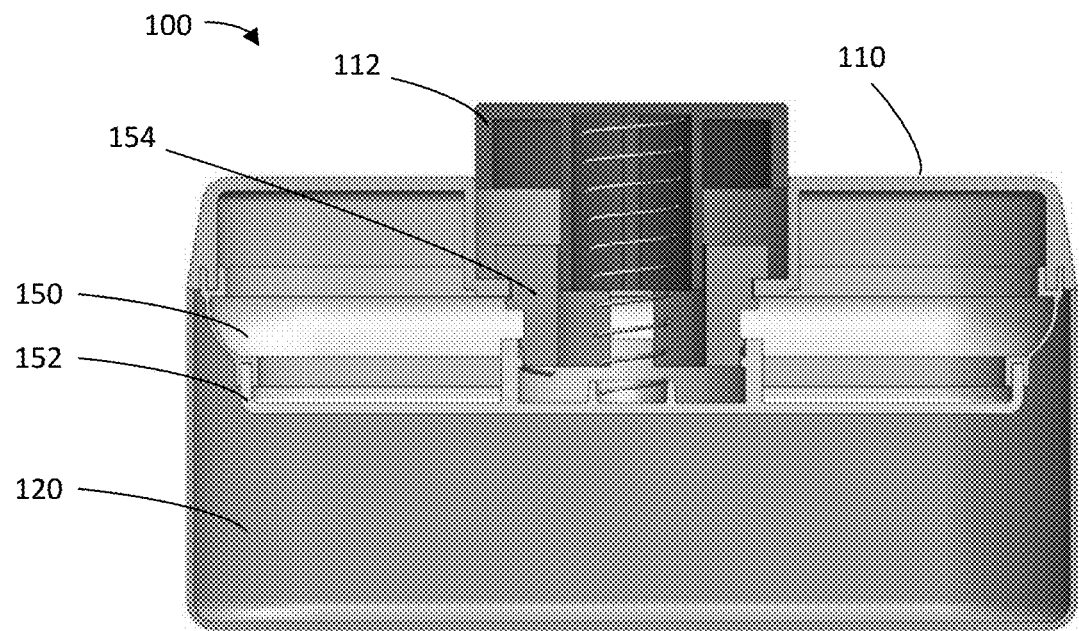
FIGS. 4A-4D illustrate a series of cross-sectional views of an example locking mechanism during a locking procedure of the intelligent storage device of FIG. 1 in accordance with certain embodiments.

FIGS. 4A-4D show an example locking mechanism that may be used to carry out a sealing and locking procedure of the device 100, in accordance with embodiments. FIG. 4A illustrates a cross sectional view of the device 100 in an unlocked and unsealed state. A sealing mechanism 150 is connected to the lid 110, but does not form an airtight or water tight seal with the box 120, even after coupling the lid 110 to the box 120. In some embodiments, the locking mechanism includes the sealing mechanism 150, the button or user-controllable device 112, an intermediate member 154, and a lower sealing member 152. In other embodiments, "locking mechanism" only refers to the internal components of the storage device 100 that are controlled (e.g., activated or deactivated) by user operation (or manual manipulation) of the button 112, or in response to receiving one or more user inputs via the button 112.

In some examples, the sealing mechanism 150 may include a gasket or ring made of silicone, rubber, plastic, or other suitable material, or any other type of mechanism for creating a removeable or reclosable seal that is airtight, or hermetic, and/or water tight.

Figure 4B:
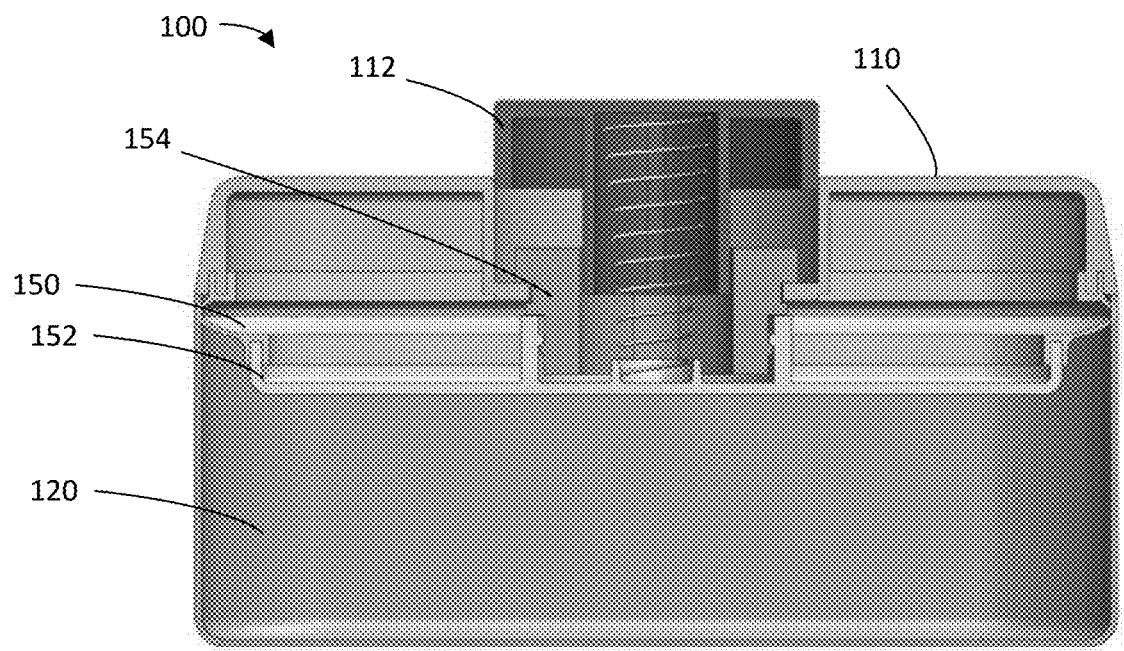

As illustrated in the cross-sectional view of FIG. 4B, when the button 112 is rotated via manual manipulation in a first direction, it causes the intermediate member 154 to rotate as well. The intermediate member 154 is connected to the lower sealing member 152 via threads, such that rotation of the intermediate member 154 causes the lower sealing member 152 to be drawn up or down (depending on the direction of rotation). In FIG. 4B, the button 112 has been rotated clockwise such that the lower sealing member 152 is drawn up toward the lid 110 and against the sealing mechanism 150. This upward pressure causes the sealing mechanism 150 to be compressed and pushed outwards toward the sides of the box 120, until flush with a perimeter of the box 120 on all four sides. In this manner, the sealing mechanism 150 may be expanded to engage the box 120 and form an airtight and water tight seal between the box 120 and the lid 110.

Referring back to FIG. 3B, after rotating the button 112 to cause the sealing mechanism 150 to expand and engage the box perimeter (as illustrated in FIGS. 4A and 4B), the button 112 may be pressed down into the lid 110 (e.g., by the user) until flush with a top surface of lid 110, as shown in FIG. 3B. Pressing the button 112 into the lid 110 causes the sealing mechanism 150 to be locked in its expanded position and thereby secures the seal between the lid 110 and the box 120. Said depressed position of the button 112 also renders the button 112 inaccessible. At this point, the locking mechanism is in a locked position and is fully activated. That is, once the device 100 is locked in this manner, a complete unlock procedure (including, e.g., pressing the button 112, receiving an authentication signal, releasing the button 112, and disengaging the sealing mechanism 150) must be completed in order to open the device 100. If, on the other hand, the button 112 is not pressed into the depressed position, the button 112 may be rotated counterclockwise to disengage the sealing mechanism 150 and open the lid 110 without requiring authentication.

Figure 4C:
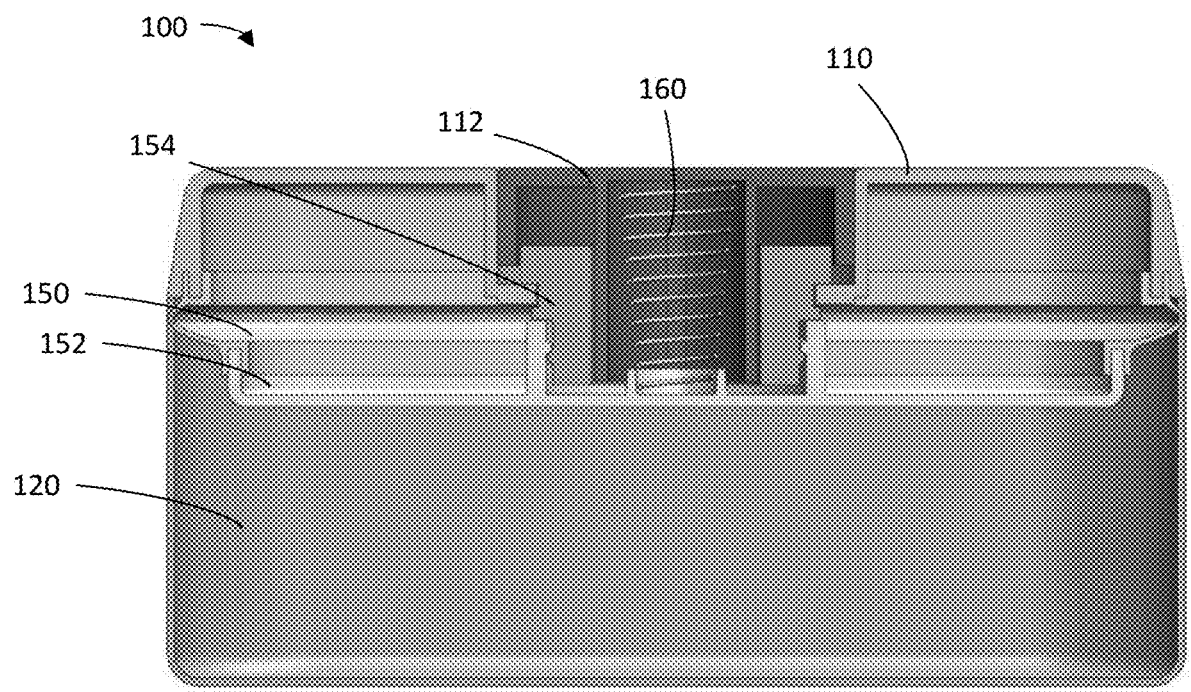

FIG. 4C illustrates a cross-sectional view of the locking mechanism being fully activated or placed in the locked position. As shown, to achieve this state, the button 112 is fully depressed, or pushed down until flush with the top of the lid 110. According to embodiments, a spring 160 may be disposed within the button 112 and may be compressed as the button 112 is pressed downward toward the box 120. The spring 160 may enter a locked position once sufficiently depressed. For example, pressing the spring 160 below a given threshold may cause the spring 160, or button 112, to engage a flange or other mechanism within the lid 110 that is configured to hold the spring 160 in the depressed position and thereby, secure the button 112 flush against with the top surface of the lid 110.

Figure 4D:
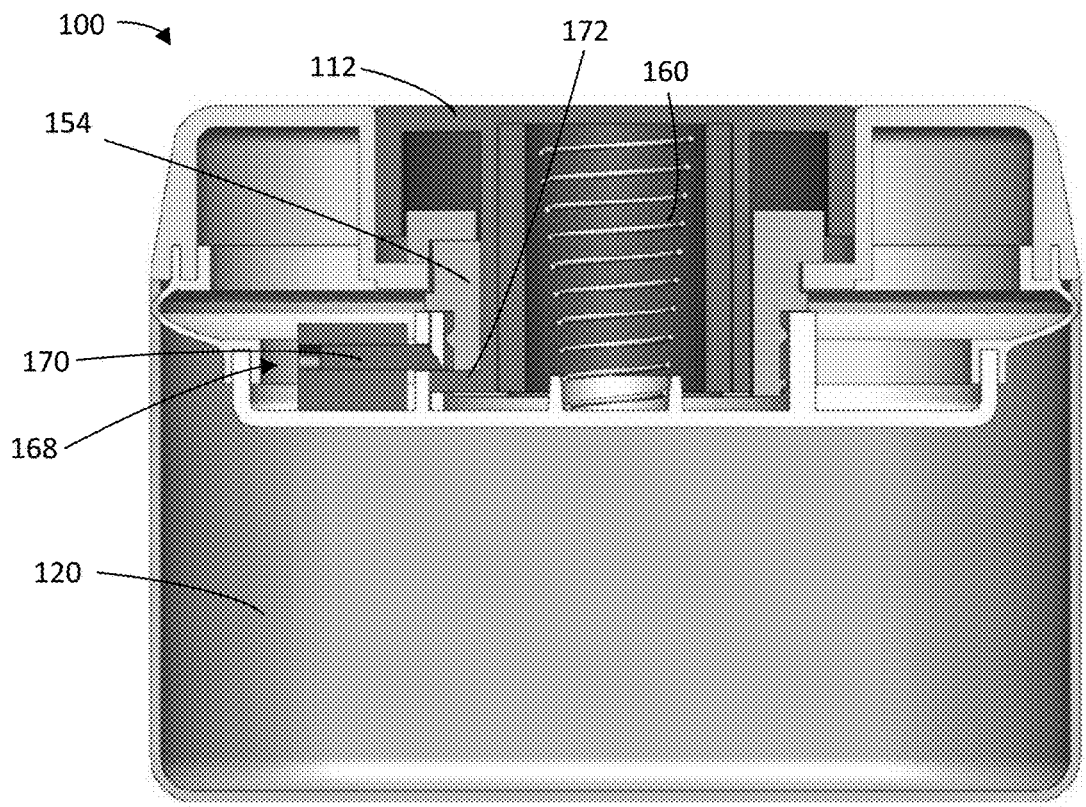

FIG. 4D illustrates a cross-sectional view of an exemplary latching mechanism 168 that may be activated upon depressing the button 112 (and after the sealing mechanism 150 is engaged with the box 120) in order to lock the button 112 into the depressed position and prevent disengagement of the sealing mechanism 150. This locked position of the locking mechanism prevents unauthorized or unintentional rotation of the button 112, as the button 112 is inaccessible, and thereby prevents unauthorized or unintentional disengagement of the sealing mechanism 150. The latching mechanism 168 may be included in, or form part of, the locking mechanism of the device 100.

As shown, the latching mechanism 168 includes a locking pin 170 configured to prevent the button 112 from springing back up (and being accessible to unauthorized users). The latching mechanism 168 may be biased such that when the button 112 is pushed down flush with the top of the lid 110, the locking pin 170 automatically engages the lower flange 172 of the button 112, for example, by blocking or preventing upward movement of the lower flange 172. As shown, the lower flange 172 has an L-shaped body that extends towards the latching mechanism 168 and fits under the locking pin 170, once the button 112 is rotated into the sealing position and pushed downwards. Alternatively, the locking pin 170 may be configured to automatically engage the lower flange 172 of the button 112 if the sealing mechanism 150 is engaged.

In embodiments, the locking pin 170 and/or latching mechanism 168 may be controlled by one or more processors or components of the various PCBs and electrical components described herein. For example, the locking pin 170 and/or latching mechanism 168 may be configured to move from an engaged position to a neutral or rest position in response to receiving an unlock signal from the PCB 206 and/or remote computing device 300. This movement causes the button 112 to be automatically released, which also releases the locking mechanism from its locked position.

Figure 5:
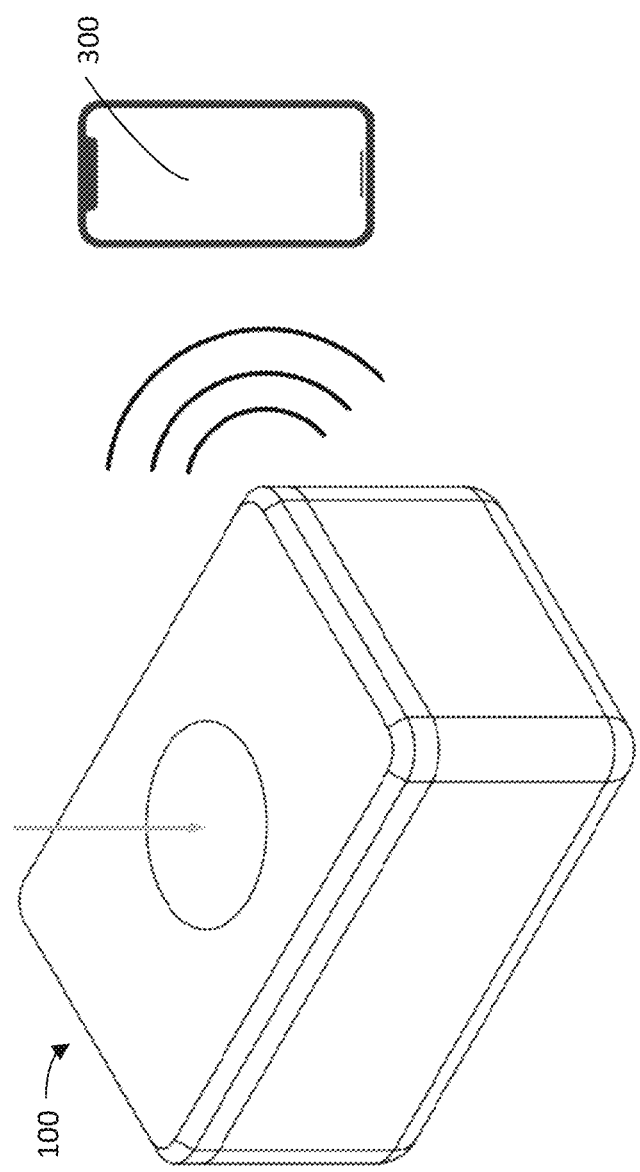
FIG. 5 illustrates an unlocking process for the intelligent storage device of FIG. 1 in accordance with certain embodiments.
Figure 6A:
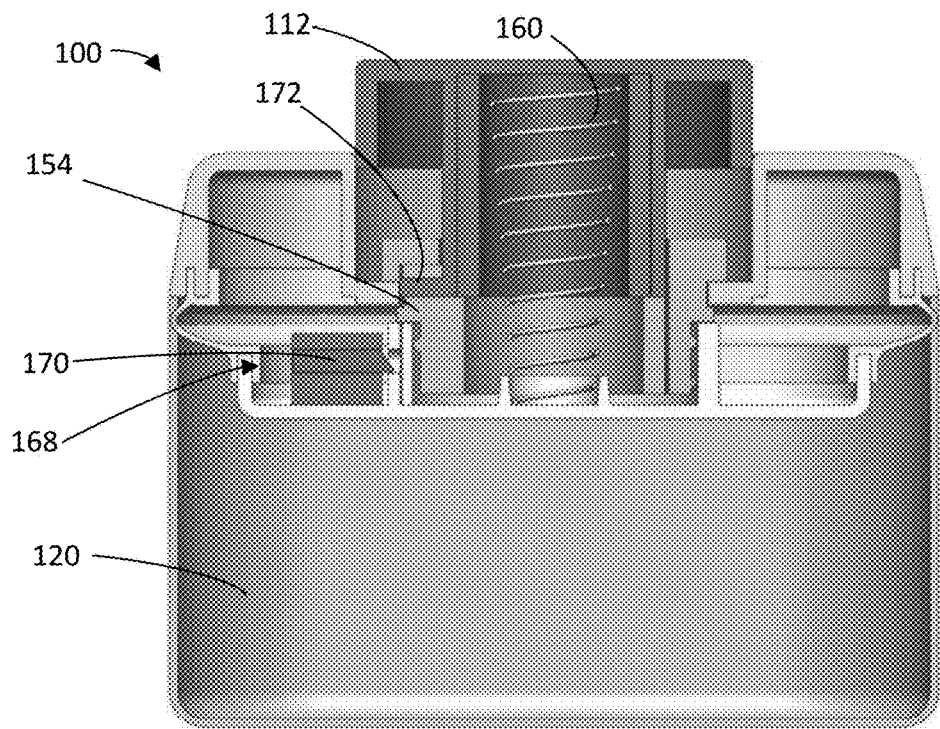
FIGS. 6A-6B illustrate a series of cross-sectional views of an example locking mechanism during an unlocking procedure of the intelligent storage device of FIG. 1 in accordance with certain embodiments.
Figure 6B:
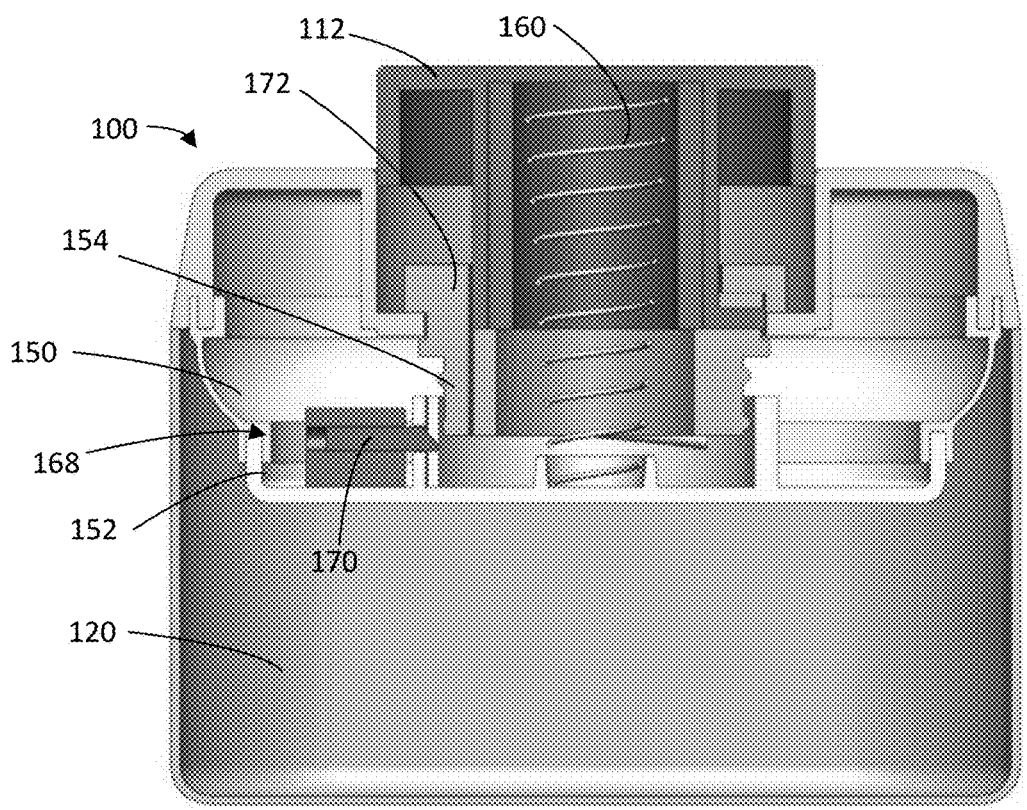

FIGS. 5 and 6A-B illustrate a process of unlocking and unsealing the device 100, or deactivating the locking mechanism, including the latching mechanism 168. In embodiments, the electronics module of the device 100 may be configured to enable deactivation of the locking mechanism in response to receiving a user authorization signal from the remote computing device 300 or other component. For example, the unlocking procedure may begin with a user pressing down on the button 112 while it is still flush with the top surface of the lid 110, or otherwise interacting with the button 112. In response, the device 100 (via the PCB 204 and/or 206) may transmit a signal to a remote computing device 300 to determine whether the user has the requisite authorization to access the contents of the box 120. If the user is authenticated, the remote device 300 will send a user authorization signal back to the device 100, or to the electronics module therein. In response, the electronics module will enable deactivation of the locking mechanism, for example, by making the button 112 accessible to the user. In some cases, this may involve automatically extending the button 112 out of the lid 110 in response to receive the signal. In other cases, deactivation is enabled by allowing the button 112 to be pressable or selectable by the user.

In FIG. 5, the remote computing device 300 is a smartphone. However, it should be appreciated that the remote computing device may be any other mobile device, tablet, personal computer, or other computing device. The signal may be transmitted by the device 100 via any suitable protocol, such as Bluetooth, Wi-Fi, Radio Frequency Identification (RFID), Near Field Communication (NFC), and more.

After the signal is received by the remote computing device 300, the remote computing device 300 and/or a user of the remote computing device 300 may perform an authentication. This can include verifying an identity of the user and/or authorizing the device 100, or other steps to confirm that whoever pressed the button 112 to start the unlocking process is an authorized user of the device 100. For example, the authentication may include determining an identity of the user pressing the button 112 and determining whether that identity is authorized to access the contents stored in the box 120.

In some examples, rather than transmitting a signal to a remote computing device 300, the device 100 may perform an authentication itself. For example, the electronics modules may include a fingerprint sensor (e.g., image scanner, optical scanner, capacitive scanner, ultrasound fingerprint scanner, thermal scanner, etc.), or other user-authentication device, for obtaining user identification information from the user, a memory for storing one or more fingerprints or other previously-provided user identification information, and appropriate processing hardware for recognizing the store fingerprints, or otherwise comparing the obtained user identification information to the previously-stored information and identifying a match. If a match is found, the electronics module enables deactivation of the locking mechanism, for example, by rendering the button 112 accessible to the user. Other examples may include various other biometric or non-biometric locking and authentication mechanisms.

Still further examples may include dual authentication, such as by having a first level of authentication performed by the device 100, and only transmitting a signal to the remote computing device 300 if the first level of authentication is met. This can include having a fingerprint sensor on the device 100 (e.g., included in the PCB 206 disposed adjacent the button 112), and transmitting a signal to the remote computing device 300 only if the fingerprint is matched to a known fingerprint.

After authentication is performed by the remote computing device 300, a responsive signal confirming that the user has authorization to access the contents of the box 120 is transmitted back to the storage device 100. Upon receiving this signal, the storage device 100, or its electronics module, initiates deactivation of the locking mechanism by causing the locking mechanism to enter an unlocked position, which in turn unlocks the button 112, or causes the button 112 to extend out from the top surface of the lid 110 once more, so that it is accessible for user operation or rotation. For example, the signal may be provided to a processor of the electronics module in the device 100, and the processor may be configured to cause the latching mechanism 168 to be disabled (e.g., by moving the locking pin 170 away from the flange 172), or otherwise release the button 112 to its neutral state (e.g., as shown in FIG. 4B). This extended/neutral state of the button 112 enables the user to grip the button 112 and rotate it counterclockwise, thereby disengaging the sealing mechanism 150 and completing the deactivation of the locking mechanism. Once the locking mechanism is fully deactivated, the lid 110 can be removed from the box 120. This is shown in the series of cross sectional views illustrated by FIGS. 6A-6B.

Specifically, referring back to FIG. 4D where the device 100 is shown in the locked and sealed state, a user may first press, or otherwise engage or interact with, the button 112 to cause the above-described authentication procedure to occur. As shown in FIG. 6A, when a responsive unlocking signal is received by the device 100, the device 100 may responsively cause the locking pin 170 to retract into the latching mechanism 168. When the locking pin 170 retracts, the flange 172 of the button 112 disengages from the pin 170. The compressed spring 160 then forces the button 112 upward and away from the box 120, taking the lower flange 172 with it, as shown.

On the button 112 is unlocked, or released from its locked position, the user need only rotate the button 112 to complete deactivation of the locking mechanism, or unlock the device 100. More specifically, after the button 112 is released and forced upward, the button 112 may be rotated by the user to disengage the sealing mechanism 150, thus also disengaging the locking mechanism of the device 100. This is illustrated in FIG. 6B.

In FIG. 6B, the user has rotated the button 112 counterclockwise, thereby causing the intermediate member 154 to rotate counter-clockwise. This, in turn, causes the lower sealing member 152 to be pushed downward into the box 120 and away from the lid 110. The bottom of the sealing mechanism 150 is connected to the lower sealing member 152 and therefore, when the lower sealing member 152 is pushed downward into the box 120, the sealing mechanism 150 is disengaged from, or no longer pressed against, the sides of the box 120. Thus, the seal formed by the sealing mechanism 150 is no longer airtight or water tight.

As noted above, communication between the storage device 100 and the remote computing device 300 may be via Bluetooth, Wi-Fi, or any other suitable wireless protocol.

In some examples, the button press that initiates the unlock process shown in FIG. 5 may be a simple tap or touch. Alternatively, a user may swipe across the button 112, or may be required to maintain contact with the button 112 for a period of time (e.g., 2 seconds). For example, the button 112 may include a touch-sensitive surface or device configured to detect a touch, tap, swipe, or other contact using a user's finger or other body part. Other options may be used as well.

In some examples, the button 112 may include a fingerprint sensor, pulse sensor, or other biometric sensor. These sensor(s) may provide added security, by only initiating the unlock process under certain circumstances (e.g., a recognized fingerprint). Additionally, in some examples, the signal transmitted from the storage device 100 to the remote computing device 300 may include information corresponding to the button press action, such as fingerprint data, data corresponding to a location of the storage device 100, and more. This information may be used by the remote computing device 300 to provide added security in authenticating a user of the storage device 100.

Figure 7:
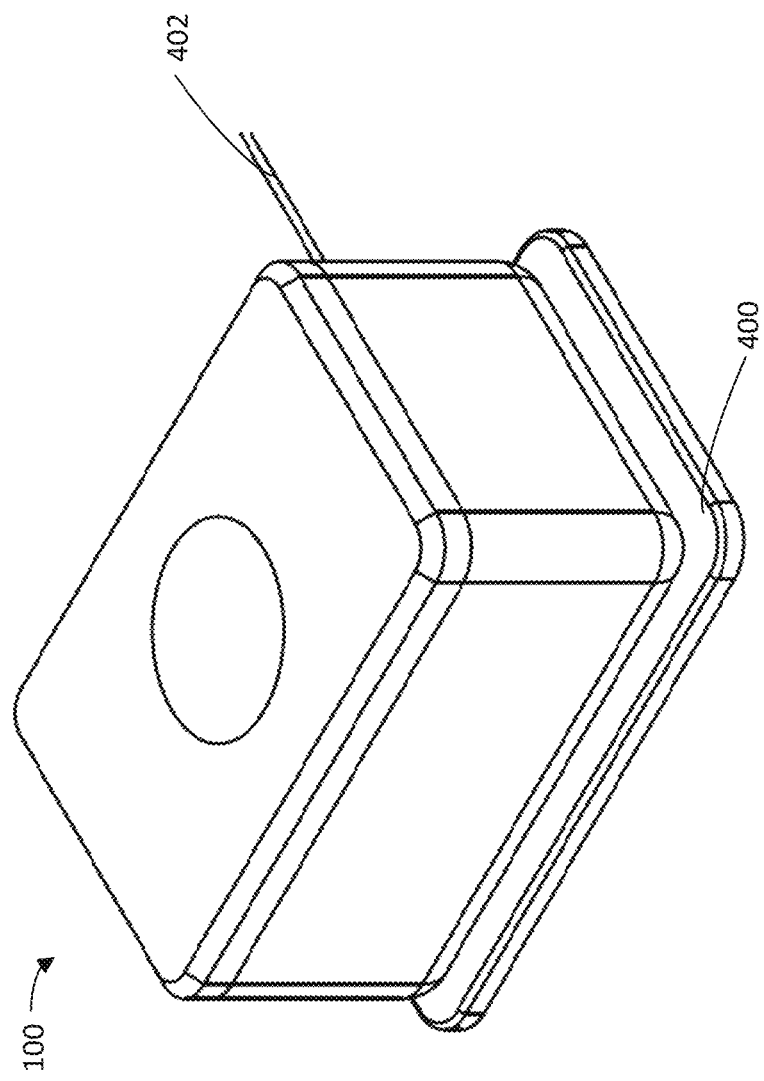
FIG. 7 illustrates an example intelligent storage device placed on a charging pad in accordance with certain embodiments.
Figure 8:
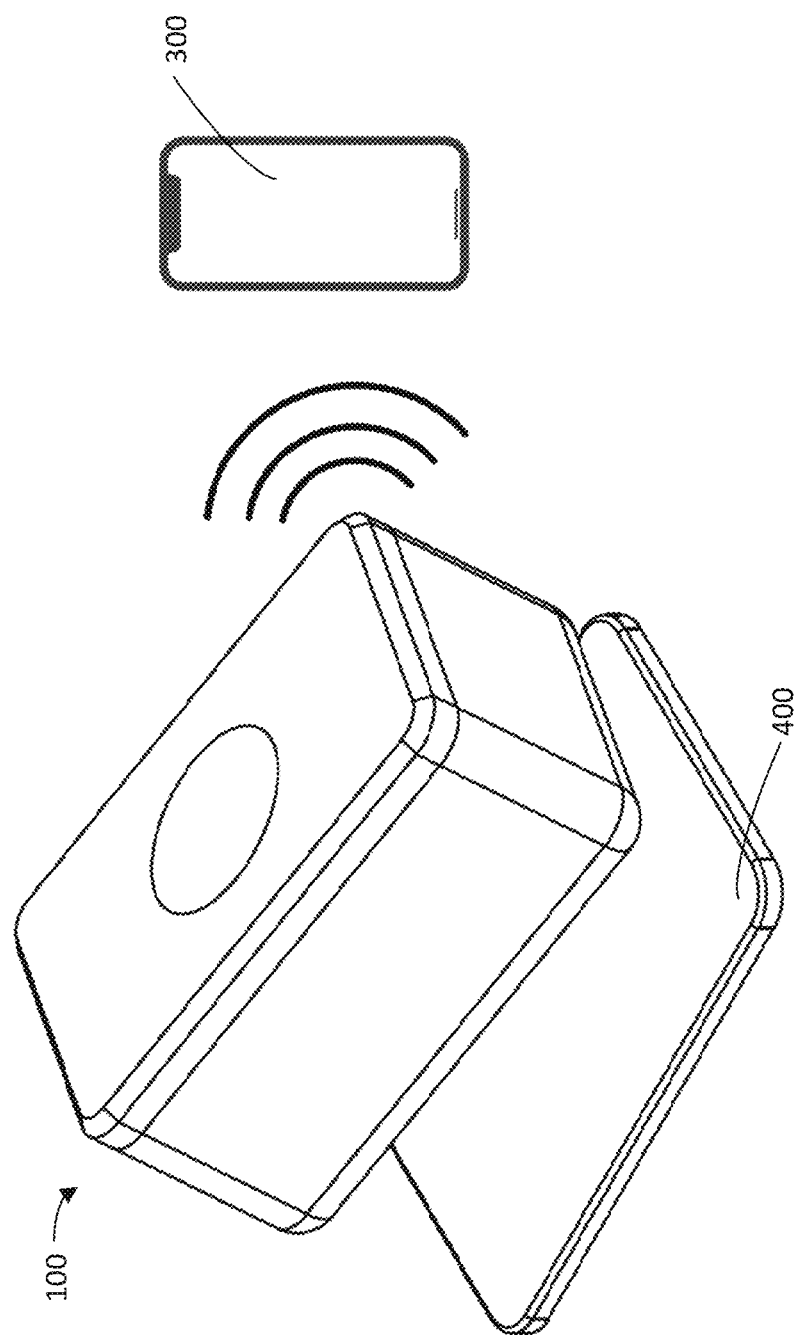
FIG. 8 illustrates movement of the example storage device of FIG. 7 in accordance with certain embodiments.

FIGS. 7 and 8 illustrate an example charging pad 400 (also referred to herein as a "base"), on which the storage device 100 is configured to rest. The charging pad 400 may have a wired connection 402 to an outlet, and may charge the battery 202 of the storage device 100 via wireless or wired connection. For example, the charging pad 400 may include inductive charging elements that have corresponding elements in the storage device 100, configured to wirelessly provide power to the battery 202. Alternatively, the charging pad 400 may include a physical connection to the storage device 100 to provide power, acting as a "dock."

The charging pad 400 may also act as an "anchor spot" configured to determine whether the storage device 100 is resting on or adjacent to the charging pad 400, or has been moved from the anchor spot. In some embodiments, the anchor pad 400 may determine that the box 120 has been moved once the box 120 is no longer adjacent to, or touching, the pad 400, or is no longer within a predetermined range (e.g., distance) of the pad 400. In other embodiments, the pad 400 may determine that the box 120 has been moved in response to receiving a signal from an accelerometer included in the pad 400. In either case, the pad 400 may include a wireless transmitter and/or receiver configured to send a signal to the remote computing device 300 once the box 120 has been moved.

In some cases, the charging pad 400 and/or the storage device 100 may include one or more sensors configured to monitor or detect a distance between the charging pad 400 and the storage box 100. For example, the charging pad 400 may include one or more proximity sensors configured to detect whether the storage device 100 is within a predetermined distance or proximity of the charging pad 400. In other cases, the charging pad 400 and/or storage device 100 may include one or more contact sensors configured to determine whether the two are in contact with or touching each other. Additionally or alternatively, the charging pad 400 and/or storage device 100 may include one or more accelerometers or other motion sensors configured to detect a movement of the storage box 100 relative to the charging pad 400. In some cases, the charging pad 400 may monitor proximity with its proximity sensors while the storage device 100 may simultaneously determine whether it has been moved based on data gathered by one or more accelerometers in the device 100. Alternatively or additionally, the storage device 100 may determine that it has been moved based on a lost connection to the charging pad 400 (e.g., by detecting an interruption in charging). The foregoing examples are not intended to be limiting and may be combined with each other, and/or with one or more other techniques and/or devices, to determine whether the storage device 100 has been moved from the anchor spot 400.

In embodiments, if the storage device 100 is moved from the anchor spot, the storage device and/or charging pad 400 may generate an alert. In some embodiments, the alert may be a warning signal generated by the charging pad 400 upon detecting the movement and transmitted to the remote computing device 300 to inform the user of the movement. In some cases, the warning signal may be transmitted directly to the device 300 using a wireless transceiver of the charging pad 400. In other cases, the warning signal may be transmitted first to the storage device 100, for example, using a short-range communication device (e.g., NFC, RFID, Bluetooth, etc.) of the charging pad 400, and the storage device 100 may, in turn, convey or transmit the warning signal to the remote computing device 300 using a wireless communication device (e.g., WiFi, Bluetooth, cellular, etc.) of the storage device 100. In other embodiments, the alert may be an audible alarm or other warning produced by the storage device 100 itself. In some cases, the charging pad 400 may send an alert signal to the storage device 100 upon detecting the movement, and responsive to said signal, the storage device 100 may play or sound the alarm. In some cases, the storage device 100 may continue to play the alarm, either continuously or periodically, until the device 100 is returned to the charging pad 400 and/or the device 100 is unlocked by an authorized user.

In some examples, the storage device 100 may be configured to create a digital or temporary anchor spot separate from the charging pad 400. For example, if a user moves the storage device 100 to a different room from where the charging pad 400 is, he or she can set up a digital anchor spot for the storage device 100. If the storage device 100 is moved from the digital anchor spot, an alert may be sent to the remote computing device 300 to alert the user that the storage device 100 has been moved. A user may set up a digital anchor spot by, for example, holding down the button 112 for a predetermined amount of time (e.g., 5 seconds) while the storage device 100 is stationary, or while an accelerometer reading is constant. In response, the storage device 100 may set up the digital anchor spot, and transmit an alert to the remote computing device 300 in the event that it determines that the box 100 has been moved, using one or more of the warning techniques described above.

According to one or more embodiments described herein, provided is a method of controlling operation of an intelligent storage device (e.g., storage device 100) comprising a lid (e.g., lid 120) and a container (e.g., box 120) having an opening configured to receive the lid. Such method may comprise receiving a first user input that manipulates a user-controllable device (e.g., button 112) in a first direction, and responsive to the first user input, causing a locking mechanism of the storage device to form a seal between the lid and the container. The method may further comprise receiving a second user input that manipulates the user-controllable device in a second direction different from the first direction, and responsive to the second user input, causing the locking mechanism to enter a locked position, thereby activating the locking mechanism of the storage device.

The method may also comprise receiving a third user input at the user-controllable device for deactivating the locking mechanism, and responsive to the third user input, obtaining confirmation that the user is authorized to access the container. In addition, the method may comprise responsive to receiving said confirmation, causing the user-controllable device to move in a third direction that is opposite the second direction, thus moving the locking mechanism to an unlocked position. The method may also comprise receiving a fourth user input that manipulates the user-controllable device in a fourth direction that is opposite the first direction, and responsive to the fourth user input, disengaging the seal between the lid and the container, thereby deactivating the locking mechanism In some embodiments, the first user input may be a rotation of the user-controllable device in the first direction and the fourth user input is a rotation of the user-controllable device in the fourth direction. In some embodiments, the second user input may be a downward press of the user-controllable device causing the user-controllable device to travel down and into the lid along the second direction. In some embodiments, the third user input may be a second downward press of the user-controllable device causing the user-controllable device to travel up and away from the lid along the third direction.

Figure 9:
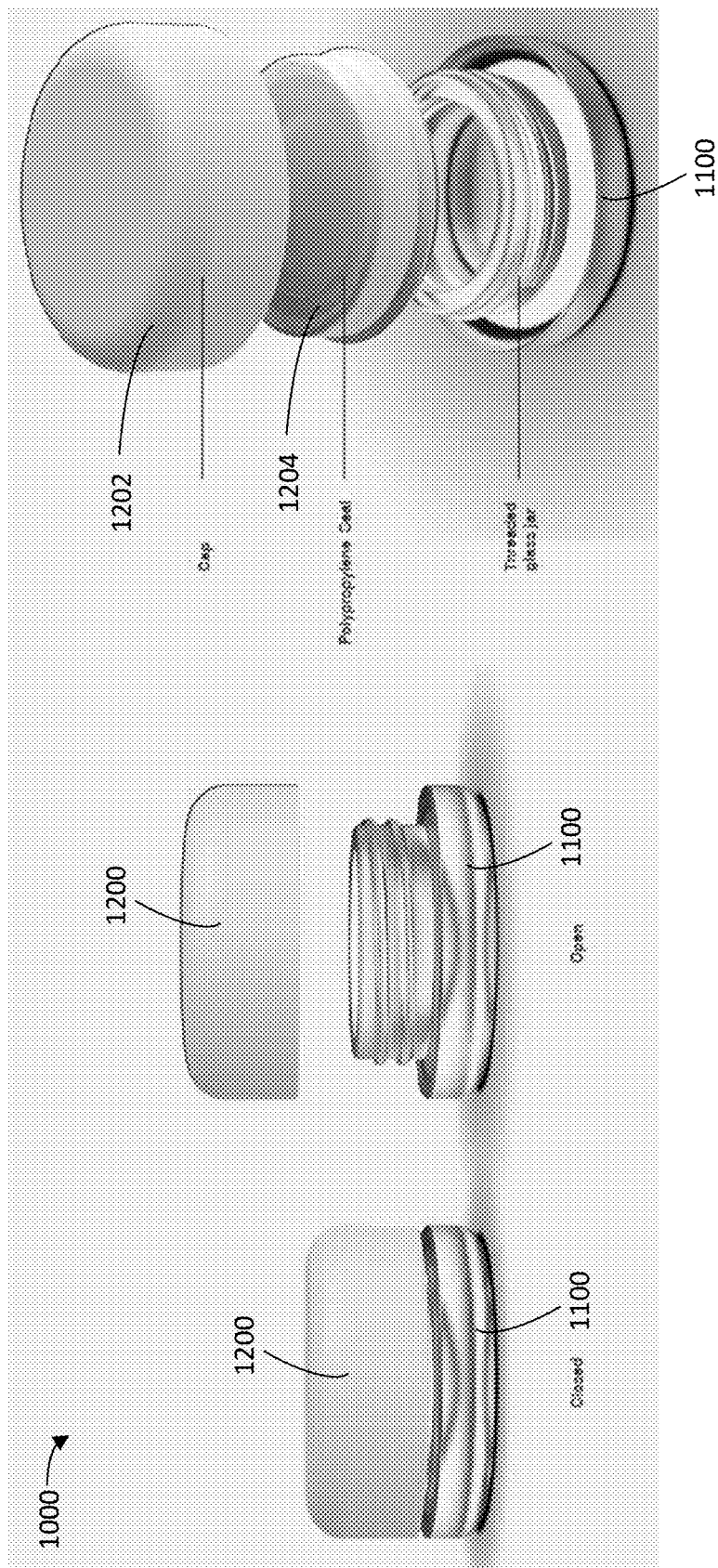
FIG. 9 illustrates an example concentrate container in a closed, open, and expanded view in accordance with certain embodiments.
Figure 10:
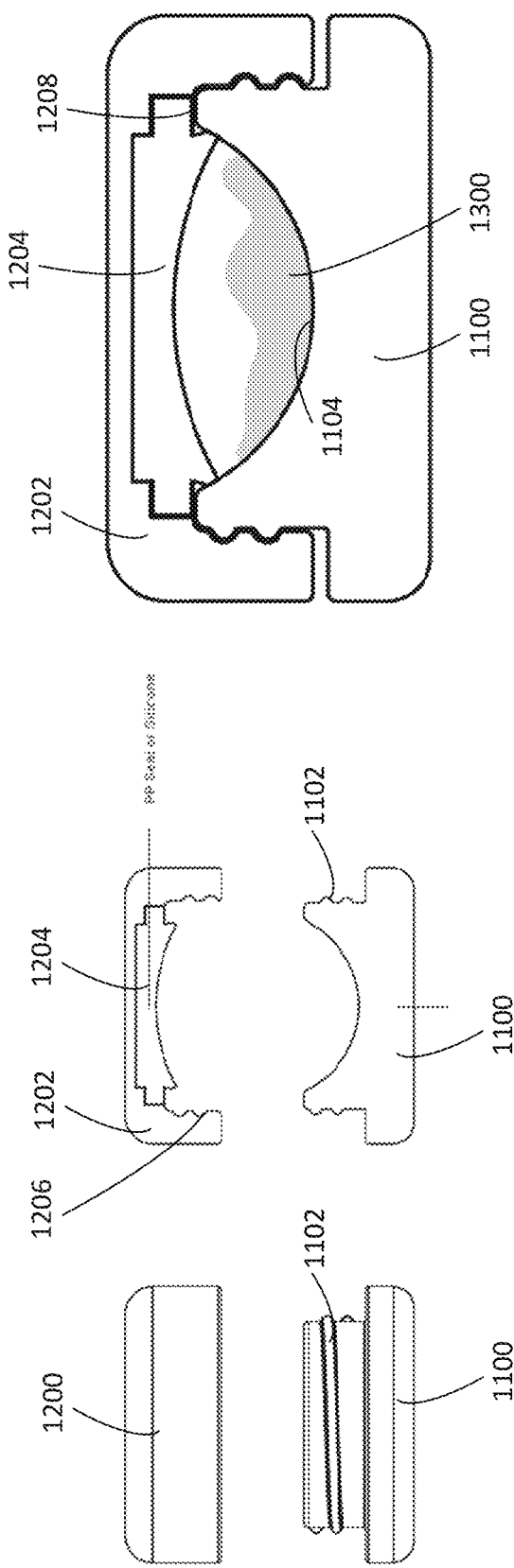
FIG. 10 illustrates additional views of the concentrate container of FIG. 9.

FIGS. 9 and 10 illustrate a concentrate container 1000 according to embodiments of the present disclosure. The concentrate container 1000 may be configured for storage of various materials, in particular concentrated substances, which are often sticky and difficult to manipulate. In some cases, previous concentrate storage options result in the concentrate getting stuck on the cap of the container, flowing into threads of the container, or getting stuck in various corners and crevices of the container. The container 1000 of the present disclosure addresses these issues by including a curved inner surface for holding the concentrate and using a seal configured to prevent concentrate from seeping onto the threads of the container.

The container 1000 of FIGS. 9 and 10 includes a bottom portion 1100 and a top portion 1200.

The bottom portion 1100 may be made from any suitable material, including glass, metal, ceramic, and more. The bottom portion 1100 may include threads 1102. The threads 1102 may be standard threading, or may be configured for child prevention (i.e., child lock threads). Threads 1102 may correspond to inner threads 1206 of the top portion 1200.

Bottom portion 1100 may include a concave inner surface 1104 configured to hold the concentrate 1300. The concave inner surface 1104 may enable easier access to the concentrate 1300 that previous containers. The concave inner surface 1104 may also cause the concentrate 1300 to pool at a center of the surface 1104, preventing concentrate from getting stuck in an corners or crevices of the container (in contrast to a flat bottomed container).

The top portion 1200 includes a cap 102 and a seal 1204. The cap 1202 and seal 1204 may be integrated with each other in a single unit, or may be separate. The cap 1202 may include inner threading 1206 which corresponds to the threads 1102 of the bottom portion 1100. As shown in FIGS. 9 and 10, the top portion 1200 is configured to screw onto the bottom portion 1100 such that the top portion threads 1206 are outside the bottom portion threads 1102.

The top portion 1200 also includes a seal 1204. Seal 1204 may be circular, and may be made from polypropylene. Seal 1204 may be configured to engage the concave inner surface 1104 of the bottom portion 1100. Seal 1204 may be concave, such that a pocket or opening exists between the seal 1204 and the concave inner surface 1104, in which the concentrate 1300 is stored. In some examples, the seal 1204 may be concave such that it mirrors the concave inner surface 1104.

The seal 1204 may be configured to engage with the concave inner surface 1104 in a ring, below a top edge of the bottom portion 1100. Engagement between the seal 1204 and the concave inner surface 1104 below the top edge, prevents concentrate 1300 from spilling over onto the threading 1102 and/or 1206. It also provides an airtight and/or water tight seal, to prevent odors from escaping and maintaining the freshness of the concentrate 1300.

The seal 1204 may also be configured to engage with the top edge 1208 of the bottom portion 1100. This enables the seal to provide additional contact with the bottom portion, ensuring an airtight and water tight connection between the bottom portion 1100 and the seal 1204.

Concentrate container 1000 has been illustrated and described having a particular shape and configuration of elements. However, it should be appreciated that other shapes, sized, and configurations may be used while remaining within the scope of this disclosure.

It will be understood by those skilled in the art that various changes may be made and equivalents may be substituted without departing from the scope of the novel and non-obvious techniques disclosed in this application. Therefore, it is intended that the novel teachings of the present invention not be limited to the particular embodiment disclosed, but that they will include all embodiments falling within the scope of the appended claims.

What is claimed is:

1. A portable intelligent storage device, comprising:
a lid;
a container configured to store one or more contents and having an opening that is sized and shaped to receive the lid;
a locking mechanism configured to securely seal the lid to the container when activated;
a user-controllable device configured to control activation of said locking mechanism by:
causing the locking mechanism to form a seal between the lid and the container in response to a first user input received via the user-controllable device, and
causing the locking mechanism to enter a locked position in response to a second user input received via the user-controllable device;
a base configured to determine whether the container is adjacent to the base and to generate an alert if the container is moved away from the base; and
an electronics module configured to enable deactivation of the locking mechanism upon confirming an authorization of a user to access the contents of the container.

2. The intelligent storage device of claim 1, wherein the deactivation of the locking mechanism includes causing the locking mechanism to disengage the seal in response to a third user input received via the user-controllable device.

3. The intelligent storage device of claim 1, wherein the electronics module enables the deactivation of the locking mechanism by rendering access to the user-controllable button.

4. The intelligent storage device of claim 1, wherein the electronics module comprises a processor and a user-authentication device configured to confirm that the user is authorized, the processor enabling deactivation of the locking mechanism upon receiving a signal from the user-authentication device confirming the authorization of the user.

5. The intelligent storage device of claim 4, wherein the user-authentication device is a fingerprint sensor.

6. The intelligent storage device of claim 1, wherein the electronics module comprises a processor and a wireless transceiver for communicating with a remote computing device to determine whether the user has the authorization to access the contents of the container, the processor enabling deactivation of the locking mechanism upon receiving a signal from the wireless transceiver confirming the authorization of the user.

7. The intelligent storage device of claim 6, wherein the electronics module further comprises a user-authentication device configured to obtain identification information from the user, the wireless transceiver transmitting the identification information to the remote computing device for comparison to previously-stored identification information.

8. The intelligent storage device of claim 1, wherein the base is further configured to provide power to the storage device.

9. The intelligent storage device of claim 1, wherein the user-controllable device is a rotatable, depressible button, the first user input being a rotation of the button to form the seal, and the second user input being a downward press on the button to enter the locked position.

10. The intelligent storage device of claim 9, wherein the button is configured to be rotated in a first direction to engage the seal during activation of the locking mechanism, and rotated in a second, opposite direction to disengage the seal during deactivation of the locking mechanism.

11. An intelligent storage device, comprising:
- a lid with a locking mechanism and a user-controllable device configured to activate the locking mechanism upon receiving a first user input;
- a container with an opening sized and shaped to receive the lid, wherein the locking mechanism is configured to securely seal the lid to the container when activated;
- a motion sensor; and
- an electronics module configured to:
  - cause deactivation of the locking mechanism in response to receiving a second user input via the user-controllable device and a wireless signal from a remote computing device confirming authorization of the user to access the storage device; and
  - send an alert to the remote computing device in response to the motion sensor detecting movement of the intelligent storage device.

12. The intelligent storage device of claim 11, wherein the user-controllable device includes a user-authentication device configured to capture user identification information for determining whether a user has authorization to access the storage device.

13. The intelligent storage device of claim 12, wherein the electronics module sends the user identification information to the remote computing device for verification.

14. The intelligent storage device of claim 12, wherein the user-authentication device captures the user identification information during the second user input.

15. The intelligent storage device of claim 11, wherein the first user input is a manual manipulation of the user controllable device.

16. The intelligent storage device of claim 11, wherein the electronics module is further configured to play an audible alarm in response to the motion sensor detecting movement of the intelligent storage device.

17. The intelligent storage device of claim 11, wherein the alert is sent in response to the motion sensor detecting movement of the intelligent storage device from a digital anchor spot.

18. The intelligent storage device of claim 17, wherein the digital anchor spot corresponds to a fixed location where the intelligent storage device was at a time a user input was received by the intelligent storage device to establish the digital anchor spot.

19. A method of controlling operation of an intelligent storage device comprising a lid and a container having an opening configured to receive the lid, the method comprising:
- receiving a first user input that rotates a user-controllable device in a first direction;
- responsive to the first user input, causing a locking mechanism of the storage device to form a seal between the lid and the container;
- receiving a second user input that manipulates the user-controllable device in a second direction different from the first direction;
- responsive to the second user input, causing the locking mechanism to enter a locked position, thereby activating the locking mechanism of the storage device;
- receiving a third user input at the user-controllable device for deactivating the locking mechanism;
- responsive to the third user input, obtaining confirmation that the user is authorized to access the container;
- responsive to receiving said confirmation, causing the user-controllable device to move in a third direction that is opposite the second direction, thus moving the locking mechanism to an unlocked position;
- receiving a fourth user input that rotates the user-controllable device in a fourth direction that is opposite the first direction; and
- responsive to the fourth user input, disengaging the seal between the lid and the container, thereby deactivating the locking mechanism.

20. The method of claim 19, wherein the second user input is a downward press of the user-controllable device causing the user-controllable device to travel down and into the lid along the second direction, and the third user input is a second downward press of the user-controllable device causing the user-controllable device to travel up and away from the lid along the third direction.

* * * * *